US012146009B2

(12) United States Patent
Niibayashi

(10) Patent No.: US 12,146,009 B2
(45) Date of Patent: Nov. 19, 2024

(54) RADICALLY POLYMERIZABLE PUTTY-LIKE RESIN COMPOSITION, SEALING AGENT AND CRACK REPAIRING METHOD

(71) Applicant: SHOWA DENKO K.K., Tokyo (JP)

(72) Inventor: Ryota Niibayashi, Kumagaya (JP)

(73) Assignee: Resonac Corporation, Tokyo (JP)

( * ) Notice: Subject to any disclaimer, the term of this patent is extended or adjusted under 35 U.S.C. 154(b) by 940 days.

(21) Appl. No.: 15/734,114

(22) PCT Filed: Apr. 11, 2019

(86) PCT No.: PCT/JP2019/015836
§ 371 (c)(1),
(2) Date: Dec. 1, 2020

(87) PCT Pub. No.: WO2019/235063
PCT Pub. Date: Dec. 12, 2019

(65) Prior Publication Data

US 2021/0214471 A1 Jul. 15, 2021

(30) Foreign Application Priority Data

Jun. 5, 2018 (JP) ................................ 2018-108075
Jan. 18, 2019 (JP) ................................ 2019-006926

(51) Int. Cl.

| | |
|---|---|
| ***C08F 2/44*** | (2006.01) |
| ***C08F 290/06*** | (2006.01) |
| ***C08K 5/00*** | (2006.01) |
| ***C08K 5/11*** | (2006.01) |
| ***C08K 5/12*** | (2006.01) |
| ***C08K 5/14*** | (2006.01) |
| ***C08K 5/17*** | (2006.01) |
| ***C08K 5/521*** | (2006.01) |
| ***C09K 3/10*** | (2006.01) |

(52) U.S. Cl.
CPC .............. *C08F 2/44* (2013.01); *C08F 290/06* (2013.01); *C08K 5/0016* (2013.01); *C08K 5/11* (2013.01); *C08K 5/12* (2013.01); *C08K 5/14* (2013.01); *C08K 5/17* (2013.01); *C08K 5/521* (2013.01); *C09K 3/10* (2013.01)

(58) Field of Classification Search
CPC ........ C08F 2/44; C08F 290/06; C08K 5/0016; C08K 5/11; C08K 5/12; C08K 5/14; C08K 5/17; C08K 5/521; C08K 3/10; C09K 3/10
See application file for complete search history.

(56) References Cited

U.S. PATENT DOCUMENTS

2008/0249246 A1* 10/2008 Okada ...................... C09K 3/10
525/221
2018/0170808 A1 6/2018 Sharmak et al.

FOREIGN PATENT DOCUMENTS

| | | | | |
|---|---|---|---|---|
| JP | 62-146364 | A | | 6/1987 |
| JP | 3-239775 | A | | 10/1991 |
| JP | 8-134426 | A | | 5/1996 |
| JP | 8-301953 | A | | 11/1996 |
| JP | 9-53281 | A | | 2/1997 |
| JP | 9-208641 | A | | 8/1997 |
| JP | 11-049833 | A | | 2/1999 |
| JP | 2002-234921 | A | | 8/2002 |
| JP | 2005-255937 | A | | 9/2005 |
| JP | 2006-016551 | A | | 1/2006 |
| JP | 2006-219624 | A | | 8/2006 |
| JP | 2006-274723 | A | | 10/2006 |
| JP | 2006274145 | A | * | 10/2006 |
| JP | 2006-306920 | A | | 11/2006 |
| JP | 2009-292890 | A | | 12/2009 |
| JP | 2015-78568 | A | | 4/2015 |
| JP | 2015-98527 | A | | 5/2015 |
| JP | 2015098527 | A | * | 5/2015 |
| JP | 2017-524784 | A | | 8/2017 |
| JP | 2018-009155 | A | | 1/2018 |

OTHER PUBLICATIONS

Translation of JP 2006274145 by Matsutani et al. (Year: 2006).*
Translation of of JP 2015098527 by Kobori et al. (Year: 2015).*
International Search Report for PCT/JP2019/015836 dated Jul. 16, 2019 (PCT/ISA/210).

* cited by examiner

*Primary Examiner* — Michael M Dollinger
*Assistant Examiner* — Christina H. W. Rosebach
(74) *Attorney, Agent, or Firm* — Sughrue Mion, PLLC

(57) ABSTRACT

The present invention relates to a radical polymerizable putty-like resin composition containing
a resin component containing a radical reactive resin (A) and a radical polymerizable unsaturated monomer (B) having a (meth)acryloyl group in a molecule thereof,
an aromatic tertiary amine (C) represented by the following general formula (I), an organic peroxide (D), and
a filler (E):

(I)

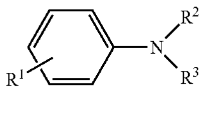

wherein,
$R^1$ is a hydrogen atom, a methyl group, or a methoxy group; and $R^2$ and $R^3$ are each independently an alkyl group having 1 to 20 carbon atoms or a hydroxyalkyl group having 1 to 20 carbon atoms.

17 Claims, No Drawings

RADICALLY POLYMERIZABLE PUTTY-LIKE RESIN COMPOSITION, SEALING AGENT AND CRACK REPAIRING METHOD

CROSS REFERENCE TO RELATED APPLICATIONS

This application is a National Stage of International Application No. PCT/JP2019/015836 filed Apr. 11, 2019, claiming priority based on Japanese Patent Application No. 2018-108075 filed Jun. 5, 2018 and Japanese Patent Application No. 2019-006926 filed Jan. 18, 2019.

TECHNICAL FIELD

The present invention relates to a radical polymerizable putty-like resin composition, a sealing agent, and a crack repairing method.

BACKGROUND ART

Concrete structures requiring repairing are recently increasing. A concrete structure is deteriorated due to neutralization, salt damage, or the like. While concrete structures having lasted more than 50 years since construction are increasing, they are required to be urgently repaired. In addition, in particular, concrete structures in cold regions are remarkably deteriorated due to an influence of a chloride, such as calcium chloride and sodium chloride, which is used as a snow melting agent, in addition to freezing and thawing of moisture contained in the concrete.

As one repairing method of a concrete structure, there is a method of injecting an injecting agent into a crack of the concrete structure. As the injection method, there are a method of injecting an injecting agent from a low pressure to a high pressure by using an injector; and a method of coating an injecting agent on the surface to penetrate into a crack. Of these, in the method of using an injector, a sealing agent is generally used for the purpose of clogging cracked portions other than an injection hole.

In the sealing agent, organic sealing agents have been generally used. Not only the sealing agent is required to have adhesiveness to the concrete substrate so as to withstand the injection pressure, but also in view of the fact that an injection washer is installed for the purpose of fitting the injector on the injection hole, it is required to have a holding power so as to fix the washer until the sealing agent is cured, namely it is important that sagging does not occur. Then, a putty-like resin composition has been used as the sealing agent. In addition, in the view of the fact that the sealing agent is removed after crack injection, it is also required that peeling and removal after the use are easy.

As the conventional putty-like resin composition, there are reported a photocurable resin composition (see PTLs 1 and 2), an epoxy resin composition not requiring light (see PTL 3), and so on. In addition, there is also a report regarding a low-temperature curable resin composition which is curable for a short time even in the low-temperature environment (see PTL 4).

CITATION LIST

Patent Literature

PTL 1: JP 2006-274145 A
PTL 2: JP 11-49833 A
PTL 3: JP 2006-219624 A
PTL 4: JP 2009-292890 A

SUMMARY OF INVENTION

Technical Problem

The photocurable resin compositions described in PTLs 1 and 2 require light for curing, and therefore, there was involved such a problem that curing delay or curing failure is caused in a portion where light hardly strikes. In addition, since curing is promoted owing to irradiation with light, there was also involved such a problem that in the external environment where sunlight strikes, it becomes difficult to secure a working time. In addition, it is known that the epoxy resin composition described in PTL 3 causes curing delay or curing failure in the low-temperature environment, and therefore, the progress of deterioration of the concrete is fast as mentioned above, and in cold regions where quick repairing is required, a problem was involved in terms of use. In addition, the low-temperature curable resin composition described in PTL 4 is not putty-like, and therefore, it cannot be applied for the sealing agent.

In the light of the above, hitherto, any material which is not controlled by the external environment, such as sunlight, and the use temperature environment and has a holding power of the washer, namely sagging does not occur has not been achieved.

In order to solve the aforementioned problem, the present invention was made, and an object thereof is to provide a radical polymerizable putty-like resin composition which is cured for a short time even in the low-temperature environment of not higher than −10° C.; even when fitting a washer, does not cause sagging; and is able to provide a cured product having favorable adhesiveness.

In addition, another object of the present invention is to provide a sealing agent containing the aforementioned putty-like resin composition and a crack repairing method using the same.

Solution to Problem

In order to solve the aforementioned problems, the present inventor and others made extensive and intensive investigations. As a result, it has been found that the foregoing problems can be solved by the following inventions.

Specifically, the disclosures of the present application are concerned with the following.

[1] A radical polymerizable putty-like resin composition containing a resin component containing a radical reactive resin (A) and a radical polymerizable unsaturated monomer (B) having a (meth)acryloyl group in a molecule thereof, an aromatic tertiary amine (C) represented by the following general formula (I), an organic peroxide (D), and a filler (E):

(I)

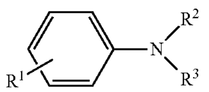

wherein, $R^1$ is a hydrogen atom, a methyl group, or a methoxy group; and $R^2$ and $R^3$ are each independently an alkyl group having 1 to 20 carbon atoms or a hydroxyalkyl group having 1 to 20 carbon atoms.

[2] The radical polymerizable putty-like resin composition as set forth in the above [1], further containing a plasticizer (F).

[3] The radical polymerizable putty-like resin composition as set forth in the above [1] or [2], further containing an internal release agent (G).

[4] The radical polymerizable putty-like resin composition as set forth in any of the above [1] to [3], wherein the radical reactive resin (A) is at least one selected from the group consisting of a vinyl ester resin, a urethane (meth) acrylate resin, and a polyester (meth)acrylate resin.

[5] The radical polymerizable putty-like resin composition as set forth in any of the above [1] to [4], wherein the radical polymerizable unsaturated monomer (B) is at least one selected from the group consisting of a mono(meth) acrylic acid ester, a di(meth)acrylic acid ester, and a tri (meth)acrylic acid ester.

[6] The radical polymerizable putty-like resin composition as set forth in any of the above [1] to [5], wherein in the aromatic tertiary amine (C) represented by the general formula (I), $R^1$ is a hydrogen atom, a methyl group, or a methoxy group; and $R^2$ and $R^3$ are each independently an alkyl group having 1 to 6 carbon atoms or a hydroxyalkyl group having 1 to 6 carbon atoms.

[7] The radical polymerizable putty-like resin composition as set forth in any of the above [1] to [6], wherein the organic peroxide (D) is at least one selected from the group consisting of dibenzoyl peroxide, benzoyl m-methylbenzoyl peroxide, m-toluoyl peroxide, methyl ethyl ketone peroxide, cumene hydroperoxide, and t-butyl peroxybenzoate.

[8] The radical polymerizable putty-like resin composition as set forth in any of the above [1] to [7], wherein the filler (E) is at least one selected from the group consisting of an inorganic filler made of talc, calcium carbonate, silica sand, or fine particulate silica; and an organic filler made of an organic compound fiber made of a polyester or a polyolefin.

[9] The radical polymerizable putty-like resin composition as set forth in any of the above [2] to [8], further containing a plasticizer (F), the plasticizer (F) being at least one selected from the group consisting of a phthalic acid ester, an adipic acid ester, and a citric acid ester.

[10] The radical polymerizable putty-like resin composition as set forth in any of the above [3] to [9], further containing an internal release agent (G), the internal release agent (G) being a phosphoric acid ester.

[11] The radical polymerizable putty-like resin composition as set forth in any of the above [1] to [10], wherein a mass ratio [(A)/(B)] of the radical reactive resin (A) to the radical polymerizable unsaturated monomer (B) is ¼ to 3/2.

[12] The radical polymerizable putty-like resin composition as set forth in any of the above [1] to [11], wherein the content of the radical reactive resin (A) relative to the whole amount of the radical polymerizable putty-like resin composition is from 20 to 60% by mass.

[13] The radical polymerizable putty-like resin composition as set forth in any of the above [1] to [12], wherein the content of the radical polymerizable unsaturated monomer (B) relative to the whole amount of the radical polymerizable putty-like resin composition is from 40 to 80% by mass.

[14] The radical polymerizable putty-like resin composition as set forth in any of the above [1] to [13], wherein the content of the aromatic tertiary amine (C) represented by the general formula (I) is from 0.1 to 10 parts by mass based on 100 parts by mass of the resin component.

[15] The radical polymerizable putty-like resin composition as set forth in any of the above [1] to [14], wherein the content of the organic peroxide (D) is from 0.1 to 10 parts by mass based on 100 parts by mass of the resin component.

[16] The radical polymerizable putty-like resin composition as set forth in any of the above [1] to [15], wherein the content of the filler (E) is from 0.1 to 100 parts by mass based on 100 parts by mass of the resin component.

[17] The radical polymerizable putty-like resin composition as set forth in any of the above [2] to [16], further containing a plasticizer (F), the content of the plasticizer (F) being from 5 to 200 parts by mass based on 100 parts by mass of the resin component.

[18] A sealing agent containing the radical polymerizable putty-like resin composition as set forth in any of the above [1] to [17].

[19] A crack repairing method including a step of coating the sealing agent as set forth in the above on the cracked surface of a structure and then curing.

[20] The crack repairing method as set forth in the above [19], further injecting an injecting agent into a crack of the structure, curing, and then removing the sealing agent.

Advantageous Effects of Invention

In accordance with the present invention, it is possible to provide a radical polymerizable putty-like resin composition which is cured for a short time even in the low-temperature environment of not higher than −10° C.; even when fitting a washer, does not cause sagging; and is able to provide a cured product having favorable adhesiveness.

In addition, the sealing agent of the present invention contains the aforementioned radical polymerizable putty-like resin composition, and therefore, it is cured for a short time even in the low-temperature environment of not higher than −10° C., does not cause sagging, and has favorable adhesiveness. In consequence, by using the sealing agent of the present invention, the crack of the structure can be efficiently repaired in a variety of environments.

DESCRIPTION OF EMBODIMENTS

The radical polymerizable putty-like resin composition (hereinafter also referred to simply as "resin composition"), the sealing agent, and the crack repairing method of the present invention are hereunder described in detail.

In the present invention, the "putty-like resin composition" refers to a resin composition having a thixo index (TI) of 3.5 or more.

[TI]

The technical terminology "TI" which is used in the present invention is one obtained by measuring the radical polymerizable putty-like resin composition of the present invention at 25° C. by the following measurement method on the basis of the prescription of JIS K6901 5.5, 5.6.

<Measurement Method>

1) The radical polymerizable putty-like resin composition is charged in a sample bottle and allowed to stand for 2 hours in a constant temperature water bath at 25° C. in a light-shielding environment, and then, a viscosity is measured with a BH type viscometer at 20 rpm and 2 rpm, respectively.

2) A value obtained by dividing a numerical value measured at 2 rpm by a numerical value measured at 20 rpm is a thixotropy index, and this is designated as "TI".

[Radical Polymerizable Putty-Like Resin Composition]

The radical polymerizable putty-like resin composition of the present embodiment is one containing a resin component containing a radical reactive resin (A) and a radical polymerizable unsaturated monomer (B) having a (meth)acryloyl group in a molecule thereof, an aromatic tertiary amine (C) represented by the following general formula (I), an organic peroxide (D), and a filler (E).

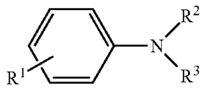

(I)

In the formula, $R^1$ is a hydrogen atom, a methyl group, or a methoxy group; and $R^2$ and $R^3$ are each independently an alkyl group having 1 to 20 carbon atoms or a hydroxyalkyl group having 1 to 20 carbon atoms.

<Resin Component>

The resin component which is contained in the radical polymerizable putty-like resin composition of the present embodiment contains a radical reactive resin (A) and a radical polymerizable unsaturated monomer (B) having a (meth)acryloyl group in a molecule thereof (hereinafter occasionally referred to as "radical polymerizable unsaturated monomer (B)"), and preferably, is composed of a radical reactive resin (A) and a radical polymerizable unsaturated monomer (B). In the present embodiment, the "(meth)acryloyl group" means "one or both of an acryloyl group and a methacryloyl group". In the present embodiment, the "(meth)acrylate" means "one or both of an acrylate and a methacrylate"

<<Radical Reactive Resin (A)>>

The radical reactive resin (A) has an ethylenic carbon-carbon double bond in a side chain and/or a main chain thereof. The radical reactive resin (A) is preferably at least one selected from the group consisting of a vinyl ester resin, a urethane (meth)acrylate resin, and a polyester (meth) acrylate resin.

(Vinyl Ester Resin)

The vinyl ester resin is occasionally called an epoxy (meth)acrylate resin. As the vinyl ester resin, conventionally known vinyl ester resins obtained through an esterification reaction of an epoxy compound and an unsaturated monobasic acid (saturated bibasic acid, if desired) can be used without being restricted. Such a known vinyl ester resin is described, for example, in "Polyester Resin Handbook", published by Nikkan Kogyo Shimbun, published in 1988; "Dictionary of Paint Dictionary", edited by the Color Materials Association, published in 1993; and the like.

Examples of the epoxy compound which is used as the raw material of the vinyl ester resin include a reaction product of bisphenol A and epichlorohydrin, a reaction product of hydrogenated bisphenol A and epichlorohydrin, a reaction product of cyclohexanedimethanol and epichlorohydrin, a reaction product of norbornane dialcohol epichlorohydrin, a and reaction product of tetrabromobisphenol A and epichlorohydrin, a reaction product of tricyclodecanedimethanol and epichlorohydrin, an alicyclic diepoxy carbonate, an alicyclic diepoxyacetal, an alicyclic diepoxycarboxylate, a novolak type glycidyl ether, and a cresol novolak type glycidyl ether.

Examples of the unsaturated monobasic acid which is used as the raw material of the vinyl ester resin include acrylic acid and methacrylic acid.

Examples of the saturated dibasic acid which is used as the raw material of the vinyl ester resin include adipic acid, sebacic acid, and dimer acid.

As the vinyl ester resin in the present embodiment, a bisphenol A-based vinyl ester resin is preferred from the viewpoint of flexibility and toughness of a cured product.

(Urethane (Meth)Acrylate Resin)

The urethane (meth)acrylate resin in the present embodiment is a polyurethane having an ethylenic carbon-carbon double bond. Specifically, the urethane (meth)acrylate resin is an ethylenic carbon-carbon double bond-containing oligomer which is obtained by reacting a polyisocyanate with a polyhydroxy compound or a polyhydric alcohol and then reacting the excessive isocyanate group with a hydroxy group-containing (meth)acrylate. In the aforementioned reaction, a hydroxy group-containing allyl ether compound may be reacted together with the hydroxy group-containing (meth)acrylate, as the need arises. In addition, the urethane (meth)acrylate resin may be produced by reacting a polyisocyanate with a polyhydroxy compound or a polyhydric alcohol and a hydroxy group-containing (meth)acrylate and then reacting a polyisocyanate with an unreacted hydroxy group derived from the polyhydroxy compound or the polyhydric alcohol. In this reaction, a hydroxy group-containing allyl ether compound may also be reacted together with the hydroxy group-containing (meth)acrylate, as the need arises.

Examples of the polyisocyanate which is used as the raw material of the urethane (meth)acrylate resin include 2,4-tolylene diisocyanate and isomers thereof, diphenylmethane diisocyanate, hexamethylene diisocyanate, hydrogenated xylylene diisocyanate, isophorone diisocyanate, xylylene diisocyanate, dicyclohexylmethane diisocyanate, naphthalene diisocyanate, triphenylmethane triisocyanate, BURNOCK (registered trademark) D-750 (trade name, manufactured by DIC Corporation), CRISBON (registered trademark) NK (trade name, manufactured by DIC Corporation), DESMODUR (registered trademark) L (trade name, manufactured by Sumitomo Bayer Urethane Co., Ltd.), COLONATE L (trade name, manufactured by Nippon Polyurethane Industry Co., Ltd.), TAKENATE (registered trademark) D102 (trade name, manufactured by Mitsui Chemicals, Inc.), ISONATE 143 L (trade name, manufactured by Mitsubishi Chemical Corporation), and DURANATE (registered trademark) Series (trade name, manufactured by Asahi Kasei Chemical Corporation). These polyisocyanates may be used alone or may be used in admixture of two or more thereof. Of these, from the viewpoint of cost, diphenylmethane diisocyanate is preferred; from the viewpoint of imparting weather resistance to the resin, hexamethylene diisocyanate, hydrogenated xylylene diisocyanate, and isophorone diisocyanate are preferred; and from the viewpoint of imparting toughness to the resin, polyisocyanates having a cyclic structure, such as xylylene diisocyanate, dicyclohexylmethane diisocyanate, and naphthalene diisocyanate, are preferred.

Examples of the polyhydroxy compound which is used as the raw material of the urethane (meth)acrylate resin include a polyester polyol and a polyether polyol. More specifically, examples thereof include a glycerin-ethylene oxide adduct, a glycerin propylene oxide adduct, a glycerin-tetrahydrofuran adduct, a glycerin-ethylene oxide-propylene oxide adduct, a trimethylolpropane-ethylene oxide adduct, a trimethylolpropane-propylene oxide adduct, a trimethylolpropane-tetrahydrofuran adduct, a trimethylolpropane-ethylene oxide-propylene oxide adduct, a dipentaerythritol-ethylene oxide adduct, a dipentaerythritol-propylene oxide adduct, a dipentaerythritol tetrahydrofuran adduct, and a dipentaerythritol-ethylene oxide-propylene oxide adduct.

These polyhydroxy compounds may be used alone or may be used in admixture of two or more thereof.

Examples of the polyhydric alcohol which is used as the raw material of the urethane (meth)acrylate resin include ethylene glycol, diethylene glycol, triethylene glycol, polyethylene glycol, propylene glycol, dipropylene glycol, polypropylene glycol, 2-methyl-1,3-propanediol, 1,3-butanediol, an adduct of bisphenol A with propylene oxide or ethylene oxide, 1,2,3,4-tetrahydroxybutane, glycerin, trimethylolpropane, 1,3-butanediol, 1,2-cyclohexane glycol, 1,3-cyclohexane glycol, 1,4-cyclohexane glycol, paraxylene glycol, bicyclohexyl-4,4-diol, 2,6-decalin glycol, and 2,7-decalin glycol. Of these, polyethylene glycol and polypropylene glycol are preferred from the viewpoint of imparting flexibility to the resin composition.

These polyhydric alcohols may be used alone or may be used in admixture of two or more thereof.

Examples of the hydroxy group-containing (meth)acrylate which is used as the raw material of the urethane (meth)acrylate resin include 2-hydroxyethyl (meth)acrylate, 2-hydroxypropyl (meth)acrylate, 3-hydroxybutyl (meth) acrylate, polyethylene glycol mono(meth)acrylate, polypropylene glycol mono(meth)acrylate, a di(meth)acrylate of tris(hydroxyethyl) isocyanuric acid, pentaerythritol tri (meth)acrylate, glycerin (mono) (meth)acrylate, and BLEMMER (registered trademark) Series (trade name, manufactured by NOF Corporation). Of these, 2-hydroxypropyl (meth)acrylate is preferred from the viewpoint of compatibility with the radical polymerizable unsaturated monomer (B).

These hydroxy group-containing (meth)acrylates may be used alone or may be used in admixture of two or more thereof.

(Polyester (Meth)Acrylate Resin)

The polyester (meth)acrylate resin in the present embodiment is a polyester having a (meth)acryloyl group. The polyester (meth)acrylate resin can be, for example, produced by any of production methods of the following (1) to (3).

(1) An epoxy compound containing an α,β-unsaturated carboxylic acid ester group is reacted with a polyester having terminal carboxy groups obtained from at least one of a saturated polybasic acid and an unsaturated polybasic acid and a polyhydric alcohol.

(2) A hydroxy group-containing (meth)acrylate is reacted with a polyester having terminal carboxy groups obtained from at least one of a saturated polybasic acid and an unsaturated polybasic acid and a polyhydric alcohol.

(3) (Meth)acrylic acid is reacted with a polyester having terminal hydroxy groups obtained from at least one of a saturated polybasic acid and an unsaturated polybasic acid and a polyhydric alcohol.

Examples of the saturated polybasic acid which is used as the raw material of the polyester (meth)acrylate resin include a polybasic acid not having a polymerizable unsaturated bond, such as phthalic acid, isophthalic acid, terephthalic acid, tetrahydrophthalic acid, adipic acid, and sebacic acid, or an anhydride thereof.

Examples of the unsaturated polybasic acid which is used as the raw material of the polyester (meth)acrylate resin include fumaric acid, maleic acid, and itaconic acid, or an anhydride thereof.

Examples of the polyhydric alcohol which is used as the raw material of the polyester (meth)acrylate resin include ethylene glycol, propylene glycol, diethylene glycol, dipropylene glycol, 1,2-butanediol, 1,3-butanediol, 1,5-pentanediol, 1,6-hexanediol, 2-methyl-1,3-propanediol, 2,2-dimethyl-1,3-propanediol, cyclohexane-1,4-dimethanol, an ethylene oxide adduct of bisphenol A, and a propylene oxide adduct of bisphenol A.

As the epoxy compound containing an α,β-unsaturated carboxylic acid ester group which is used as the raw material of the polyester (meth)acrylate resin, glycidyl methacrylate is representatively exemplified.

As the polyester (meth)acrylate resin in the present embodiment, a bisphenol A type polyester (meth)acrylate resin is preferred from the viewpoint of mechanical strength.

The content of the radical reactive resin (A) which is contained in the resin component is preferably 20% by mass to 60% by mass, and more preferably 25% by mass to 50% by mass.

The content of the radical reactive resin (A) relative to the whole amount of the radical polymerizable putty-like resin composition is preferably 20% by mass to 60% by mass, more preferably 22% by mass to 50% by mass, and still more preferably 25% by mass to 50% by mass.

<<Radical Polymerizable Unsaturated Monomer (B) Having a (Meth)Acryloyl Group in a Molecule Thereof>>

The radical polymerizable unsaturated monomer (B) is important for securing hardness and strength in a cured product of the resin composition containing this.

Although the radical polymerizable unsaturated monomer (B) in the present embodiment is not particularly limited so long as it has a (meth)acryloyl group in a molecule thereof, there are preferably exemplified a mono(meth)acrylic acid ester, a di(meth)acrylic acid ester, and a tri(meth)acrylic acid ester.

Examples of the mono(meth)acrylic acid ester include methoxyethyl (meth)acrylate, ethyl (meth)acrylate, methyl (meth)acrylate, n-propyl (meth)acrylate, isopropyl (meth) acrylate, hexyl (meth)acrylate, 2-ethylhexyl (meth)acrylate, lauryl (meth)acrylate, dodecyl (meth)acrylate, cyclopentyl (meth)acrylate, cyclohexyl (meth)acrylate, tetrahydrofuryl (meth)acrylate, acetoacetoxyethyl (meth)acrylate, dicyclopentenyloxyethyl (meth)acrylate, phenoxyethyl (meth)acrylate, and (meth)acryloyl morpholine.

Examples of the di(meth)acrylic acid ester include ethylene glycol di(meth)acrylate, diethylene glycol di(meth)acrylate, triethylene glycol di(meth)acrylate, polyethylene glycol di(meth)acrylate, propylene glycol di(meth)acrylate, dipropylene glycol di(meth)acrylate, tripropylene glycol di(meth) acrylate, polypropylene glycol di(meth)acrylate, ethoxylated bisphenol A di(meth)acrylate, tricyclodecane di(meth) acrylate, 1,10-decanediol di(meth)acrylate, 1,4-butanediol di(meth)acrylate, 1,6-hexanediol di(meth)acrylate, 1,9-nonanediol di(meth)acrylate, neopentyl glycol di(meth) acrylate, glycerin di(meth)acrylate, and ethoxylated polypropylene glycol di(meth)acrylate.

Examples of the tri(meth)acrylic acid ester include trimethylolpropane tri(meth)acrylate, ethoxylated isocyanuric acid tri(meth)acrylate, ¿-caprolactone modified tris-(2-acryloxyethyl) isocyanurate, and pentaerythritol tri(meth)acrylate.

Examples of the tetravalent or higher-valent (meth)acrylic acid ester include dimethylolpropane tetra(meth)acrylate, ethoxylated pentaerythritol tetra(meth)acrylate, dipentaerythritol poly(meth)acrylate, and dipentaerythritol hexa (meth)acrylate.

Of these, the mono(meth)acrylic acid ester and the di(meth)acrylic acid ester are preferred. Above all, lauryl (meth) acrylate, dicyclopentenyloxyethyl (meth)acrylate, and phenoxyethyl (meth)acrylate are preferred from the viewpoint of imparting flexibility to the resin; and (meth)acryloyl morpholine is preferred from the viewpoint of imparting toughness. Ethylene glycol di(meth)acrylate, diethylene glycol di(meth)acrylate, and triethylene glycol di(meth)acrylate are preferred from the viewpoint of enhancing strength of the resin. In addition, ethyl (meth)acrylate, methyl (meth) acrylate, and methoxyethyl (meth)acrylate are preferred from the viewpoint of compatibility with the additives.

In addition, a compound having a (meth)acryloyloxy group, such as 2,2-bis [4-(methacryloxyethoxy)phenyl]propane, 2,2-bis [4-(methacryloxy·diethoxy)phenyl]propane, 2,2-bis [4-(methacryloxy polyethoxy)phenyl]propane, 2,2-bis [4-(acryloxy diethoxy)phenyl]propane, and 2,2-bis [4-(acryloxy·polyethoxy)phenyl]propane; a condensate of an unsaturated acid, such as maleic acid, fumaric aid, and itaconic acid, with an alcohol; and so on can also be used.

The radical polymerizable unsaturated monomer (B) may be used alone or may be used in admixture of two or more thereof.

The content of the radical polymerizable unsaturated monomer (B) which is contained in the resin component is preferably 40% by mass to 80% by mass, and more preferably 50% by mass to 75% by mass.

The content of the radical polymerizable unsaturated monomer (B) relative to the whole amount of the radical polymerizable putty-like resin composition is preferably 40% by mass to 80% by mass, and more preferably 50% by mass to 75% by mass.

A mass ratio [(A)/(B)] of the radical reactive resin (A) to the radical polymerizable unsaturated monomer (B) is preferably ¼ to 3/2, and more preferably ⅓ to 1/1.

In the case where a radical reactive resin and a reactive monomer other than the radical reactive resin (A) and the radical polymerizable unsaturated monomer (B) are contained in the resin component, a total content of the foregoing radical reactive resin and reactive monomer relative to the whole amount of the resin component is preferably 30% by mass or less, and more preferably 25% by mass or less.

<Aromatic Tertiary Amine (C)>

The aromatic tertiary amine (C) is represented by the following general formula (I). In the present embodiment, the aromatic tertiary amine (C) functions as a curing accelerator of the resin composition.

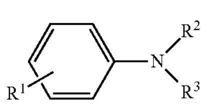

(I)

In the general formula (I), $R^1$ is a hydrogen atom, a methyl group, or a methoxy group, and preferably a methyl group.

In the general formula (I), $R^2$ and $R^3$ are each independently an alkyl group having 1 to 20 carbon atoms or a hydroxyalkyl group having 1 to 20 carbon atoms. It is preferred that both $R^2$ and $R^3$ are a hydroxyalkyl group having 1 to 20 carbon atoms. The carbon number of the alkyl group and the hydroxyalkyl group as $R^2$ and $R^3$ are preferably 1 to 10, and more preferably 1 to 6. Specifically, examples of $R^2$ and $R^3$ include a methyl group, an ethyl group, a propyl group, a n-butyl group, a t-butyl group, an octyl group, a 2-ethylhexyl group, a hydroxymethyl group, a β-hydroxyethyl group, and a β-hydroxypropyl group. Of these, a β-hydroxyethyl group and a 8-hydroxypropyl group are preferred from the viewpoint of low-temperature curability.

Examples of the aromatic tertiary amine (C) in the present embodiment include N-methyl-N-β-hydroxyethylaniline, N-butyl-N-β-hydroxyethylaniline, N-methyl-N-β-hydroxyethyl-p-toluidine, N-butyl-N-β-hydroxyethyl-p-toluidine, N-methyl-N-β-hydroxypropylaniline, N-methyl-N-β-hydroxypropyl-p-toluidine, N,N-di(β-hydroxyethyl) aniline, N,N-di(β-hydroxypropyl) aniline, N,N-di(β-hydroxyethyl)-p-toluidine, N,N-di(β-hydroxypropyl)-p-toluidine, N,N-diisopropylol-p-toluidine, N,N-di(β-hydroxyethyl)-p-anisidine, N, N-dimethylaniline, and N,N-dimethyl-p-toluidine.

Among the aforementioned aromatic tertiary amines (C), N,N-di(β-hydroxyethyl)-p-toluidine and N,N-di(β-hydroxypropyl)-p-toluidine are preferred especially from the viewpoint of low-temperature curability.

The aromatic tertiary amine (C) may be used alone or may be used in combination of two or more thereof.

In the resin composition of the present embodiment, the aromatic tertiary amine (C) is contained in an amount of preferably 0.1 parts by mass to 10 parts by mass, and more preferably 0.5 parts by mass to 5 parts by mass based on 100 parts by mass of the resin component. When the content of the aromatic tertiary amine (C) is 0.1 parts by mass or more based on 100 parts by mass of the resin component, the curability of the resin composition in the low-temperature environment becomes much more favorable. In addition, when the content of the aromatic tertiary amine (C) is 10 parts by mass or less based on 100 parts by mass of the resin component, the aromatic tertiary amine (C) does not affect the adhesiveness in the case of using the resin composition as a sealing agent, and hence, such is preferred.

<Organic Peroxide (D)>

The organic peroxide (D) acts as a radical polymerization initiator. As the organic peroxide (D), a known organic peroxide is used. The organic peroxide (D) is preferably one having a 10 hours half-life temperature of 30 to 180° C. Examples of the organic peroxide (D) include those classified as a ketone peroxide, a peroxy ketal, a hydroperoxide, a diallyl peroxide, a diacyl peroxide, a peroxy ester, and a peroxydicarbonate.

Specific examples of the organic peroxide (D) include benzoyl peroxide, dicumyl peroxide, diisopropyl peroxide, di-t-butyl peroxide, 1,1-bis(t-butylperoxy)-3,3,5-trimethylcyclohexane, 2,5-dimethyl-2,5-bis(t-butylperoxy) hexyne-3, 3-isopropyl hydroperoxide, t-butyl hydroperoxide, dicumyl peroxide, dicumyl hydroperoxide, acetyl peroxide, bis(4-t-butylcyclohexyl) peroxydicarbonate, diisopropyl peroxydicarbonate, isobutyl peroxide, 3,3,5-trimethylhexanoyl peroxide, lauryl peroxide, azobisisobutyronitrile, azobiscarbonamide, benzoyl m-methylbenzoyl peroxide, m-toluoyl peroxide, methyl ethyl ketone peroxide, cumene hydroperoxide, dibenzoyl peroxide, and t-butyl peroxybenzoate.

Of these organic peroxides (D), in particular, at least one selected from the group consisting of dibenzoyl peroxide, benzoyl m-methylbenzoyl peroxide, m-toluoyl peroxide, methyl ethyl ketone peroxide, cumene hydroperoxide, and t-butyl peroxybenzoate is preferred.

In the resin composition of the present embodiment, the organic peroxide (D) is contained in an amount of preferably 0.1 parts by mass to 10 parts by mass, and more preferably 2 parts by mass to 8 parts by mass based on 100 parts by mass of the resin component. When the content of the organic peroxide (D) is 0.1 parts by mass or more based on 100 parts by mass of the resin component, curing of the resin composition thoroughly proceeds, and hence, such is preferred. In addition, when the content of the organic peroxide (D) is 10 parts by mass or less based on 100 parts by mass of the resin component, such is economical and hence, is preferred.

<Filler (E)>

The filler (E) acts for puttying the resin composition. Examples of the filler (E) include an inorganic filler and an organic filler. Examples of the inorganic filler include talc, calcium carbonate, silica sand, fine particulate silica, mica, and asbestos. Examples of the organic filler include an organic compound fiber made of, for example, a polyester, a polyolefin, etc., a hydrogenated castor oil-based filler, an oxidized polyethylene-based filler, and an amide wax-based filler, Of these, the filler (E) is preferably at least one selected from the group consisting of an inorganic filler made of talc, calcium carbonate, silica sand, or fine particulate silica; and an organic filler made of an organic compound fiber made of a polyester or a polyolefin, and especially preferably a silica-based filler.

Specifically, a known filler, such as a silica powder, a mica powder, a calcium carbonate powder, short-fiber asbestos, and hydrogenated castor oil, can be used.

In the resin composition of the present embodiment, the filler (E) is preferably contained in an amount of 0.1 parts by mass to 100 parts by mass, more preferably contained in an amount of 0.1 parts by mass to 20 parts by mass, and still more preferably in an amount of 1 part by mass to 10 parts by mass based on 100 parts by mass of the resin component. When the content of the filler (E) is 0.1 parts by mass or more based on 100 parts by mass of the resin component, the viscosity and thixotropy of the resin component can be improved. In addition, when the content of the filler (E) is 100 parts by mass or less based on 100 parts by mass of the resin component, excellent mixing workability is exhibited.

<Plasticizer (F)>

It is preferred that the resin composition of the present embodiment further contains a plasticizer (F) from the viewpoint of control of curability and improvement in release properties of the resin composition.

Examples of the plasticizer (F) include a phthalic acid ester, such as dibutyl phthalate, diethylhexyl phthalate, diisononyl phthalate, and diisodecyl phthalate; an aliphatic dibasic acid ester inclusive of an adipic acid ester, such as diethylhexyl adipate, dibutyl adipate, and diisononyl adipate; a citric acid ester; a trimellitic acid ester; an aliphatic polyester, such as an adipic acid butylene glycol-based polyester and an adipic acid propylene glycol-based polyester; a phthalic acid-based polyester; a material having an epoxy structure, such as epoxidized soybean oil, epoxidized linseed oil, and an epoxidized fatty acid alkyl ester; a benzoic acid ester, such as 2-ethylhexyl benzoate, isodecyl benzoate, a benzoic acid glycol ester; a glycol diester; and a glycol dibenzoate, such as diethylene glycol dibenzoate, dipropylene glycol dibenzoate, and triethylene glycol dibenzoate. Of these, from the viewpoint of cost, at least one selected from the group consisting of a phthalic acid ester, an adipic acid ester and a citric acid ester is preferred, and dibutyl phthalate is especially preferred. In addition, from the viewpoint of retention in the resin composition, an aliphatic polyester, a phthalic acid-based polyester, and a benzoic acid ester are preferred, and above all, 2-ethylhexyl benzoate and isodecyl benzoate are desired.

In the resin composition of the present embodiment, the plasticizer (F) is preferably contained in an amount of 5 to 200 parts by mass, more preferably contained in an amount of 5 to 100 parts by mass, still more preferably contained in an amount of 5 to 50 parts by mass, and yet still more preferably contained in an amount 5 to 20 parts by mass based on 100 parts by mass of the resin component. By allowing the content of the plasticizer (F) to fall within the aforementioned range, the control of curability of the resin composition can be made favorable, and the release properties of a cured product of the resin composition can be improved.

<Internal Release Agent (G)>

It is preferred that the resin composition of the present embodiment further contains an internal release agent (G) from the viewpoint of improvement in release properties.

Examples of the internal release agent (G) include a phosphoric acid ester, stearic acid, zinc stearate, and a fluorine-containing release agent. In addition, examples of a commercially available product of the internal release agent (G) include ZELEC UN (trade name, manufactured by Maeda Industrial Chemicals Co., Ltd.) as a phosphoric acid ester; BYK-P9912 (trade name, manufactured by BYK-Chemie GmbH); DAIFREE FB-961 (trade name, manufactured by Daikin Industries, Ltd.) as a perfluoroalkyl polyester; DAIFREE FB-962 (trade name, manufactured by Daikin Industries, Ltd.) as a fluorine polymer; STEARIC ACID SAKURA (trade name, manufactured by NOF Corporation) as stearic acid; and ZINC STEARATE GF-200 (trade name, manufactured by NOF Corporation) as zinc stearate. Of these, from the viewpoint of retention in the resin composition, a phosphoric acid ester and a fluorine-containing release agent are preferred, and a phosphoric acid ester is more preferred. As specific commercially available products, ZELEC UN, BYK-P9912, DAIFREE FB-961, and DAIFREE FB-962, each of which is high in solubility, are preferred, and above all, ZELEC UN and BYK-P9912, each of which is a liquid, are more preferred.

In the resin composition of the present embodiment, the internal release agent (G) is preferably contained in an amount of 0.01 parts by mass or more and less than 5 parts by mass, more preferably contained in an amount of 0.01 to 1 part by mass, and still more preferably contained in an amount of 0.1 to 1 part by mass based on 100 parts by mass of the resin component. By allowing the content of the internal release agent (G) to fall within the aforementioned range, the release properties of a cured product of the resin composition can be improved.

The phosphoric acid ester may also function as the plasticizer (F) when its content is 5 parts by mass or more; however, in the present invention, it should be construed that the phosphoric acid ester is handled as the internal release agent (G).

<Optional Component>

In the resin composition of the present embodiment, a polymerization inhibitor, a wax, a reinforcing material, a coupling agent, a thixotropic auxiliary, and a curing accelerator other than the aromatic tertiary amine (C) may be added within a range where the effects of the present invention are not impaired.

Examples of the polymerization inhibitor include hydroquinone, methylhydroquinone, trimethylhydroquinone, tertiary butyl catechol, and 2,6-di-tertiary butyl-4-methylphenol. Of these, 2,6-di-tertiary butyl-4-methylphenol is preferred because it is easily mixed with the resin. The polymerization inhibitor is preferably blended in a proportion of 0.0001 parts by mass to 10 parts by mass based on 100 parts by mass of the rein component.

The wax is blended for the purpose of improving the dryness of the resin composition. As the wax, a known wax can be used without being restricted. Examples of the wax include a petroleum was, such as paraffin wax and microcrystalline; a plant wax, such as candelilla wax, rice wax, and Japanese wax; an animal wax, such as beeswax and spermaceti; a mineral wax, such as montan wax; and a synthetic wax, such as polyethylene wax and amide wax.

Specifically, examples of the wax include a paraffin wax having a melting point of about 20° C. to 80° C., BYK-S-750 (trade name, manufactured by BYK-Chemie GmbH), BYK-S-740 (trade name, manufactured by BYK-Chemie GmbH), and BYK-S-780 (trade name, manufactured by BYK-Chemie GmbH). In addition, a combination of two or more waxes having a different melting point from each other may be used. In addition, the paraffin wax may be used in combination with a dryness-imparting agent, as described in JP 2002-97233 A. In this case, the effect to be brought due to inclusion of the paraffin wax can be more effectively derived.

The wax is preferably contained in an amount of 0.01 parts by mass to 5.0 parts by mass based on 100 parts by mass of the resin component. By allowing the content of the wax to fall within the aforementioned range, not only a resin composition having favorable dryness can be provided, but also a lowering of physical properties of a cured product of the resin composition due to inclusion of the wax can be prevented from occurring.

In order to improve the solubility and dispersibility of the paraffin wax, a solvent can be used. As the solvent, a known solvent can be used. Examples of the solvent include an alkyl ether acetate, such as ethyl acetate; an ether, such as tetrahydrofuran; a ketone, such as acetone, methyl ethyl ketone, methyl isobutyl ketone, and cyclohexanone; a hydrocarbon, such as benzene, toluene, xylene, octane, decane, and dodecane; a petroleum-based solvent, such as petroleum ether, petroleum naphtha, hydrogenated petroleum naphtha, and solvent naphtha; a lactic acid ester, such as methyl lactate, ethyl lactate, and butyl lactate; dimethylformamide; and N-methylpyrrolidone.

Examples of the reinforcing material include a fine powder made of, for example, carbon, glass, ceramics, stainless steel, or the like.

As the coupling agent, a known coupling agent can be used. As the coupling agent, a silane coupling agent, such as aminosilane, vinylsilane, epoxysilane, and acrylsilane, is preferred.

Examples of the thixotropic auxiliary include polyethylene glycol, ethylene glycol, and polycarboxylic acid amide.

Although the curing accelerator other than the aromatic tertiary amine (C) is not particularly limited, examples thereof include a β-diketone, such as acetyl acetone, ethyl acetoacetate, α-acetyl-γ-butyrolactone, N-pyrogininoacetoacetamide, and N,N-dimethylacetoacetamide.

In the resin composition of the present embodiment, from the viewpoint of storage stability, it is preferred that a metal salt is not used as the curing accelerator. In the case of containing a metal salt in the resin composition, in order to secure the storage stability, it is preferred to control the content of the metal salt to not more than 1,000 ppm.

In the resin composition of the present embodiment, the content of the resin component, the aromatic tertiary amine (C) represented by the general formula (I), the organic peroxide (D), and the filler (E) is preferably 70% by mass or more, more preferably 80% by mass or more, and still more preferably 90% by mass or more. In addition, in the case where the resin composition of the present embodiment contains the plasticizer (F) and/or the internal release agent (G), in the resin composition of the present embodiment, the content of the resin component, the aromatic tertiary amine (C) represented by the general formula (I), the organic peroxide (D), the filler (E), and the plasticizer (F) and/or the internal release agent (G) is preferably 80% by mass or more, more preferably 85% by mass or more, and still more preferably 90% by mass or more.

The resin composition of the present embodiment contains the aforementioned resin component, the aromatic tertiary amine (C) represented by the general formula (I), the organic peroxide (D), and the filler (E) and further optionally contains the plasticizer (F) and the internal release agent (G).

The resin composition of the present embodiment does not require light for curing, does not cause sagging, and is able to provide a cured product having favorable adhesiveness. In addition, when the resin composition of the present embodiment contains the plasticizer (F), the release properties of the cured product of the resin composition can be enhanced.

In consequence, the resin composition of the present embodiment is suitable as a material of the sealing agent for crack repairing of a concrete structure. In particular, the cured product of the resin composition of the present embodiment has favorable adhesiveness to a material containing concrete, asphalt concrete, mortar, or the like. In consequence, the resin composition of the present embodiment is suitable as a material of the sealing agent for crack repairing of a concrete structure.

[Sealing Agent]

The sealing agent of the present embodiment is one containing the aforementioned resin composition.

The sealing agent of the present embodiment is preferably of a two-liquid type to be used in such a manner that it is separately stored into a first liquid containing the aforementioned resin component, the aromatic tertiary amine (C) represented by the general formula (I), and the filler (E) and further optionally contains the plasticizer (F) and/or the internal release agent (G) and a second liquid containing the organic peroxide (D), and the first liquid and the second liquid are mixed at the time of use.

The sealing agent of the present embodiment is able to be used for an application for repairing cracks caused in a structure made of at least one material selected from the group consisting of concrete, asphalt concrete, mortar, wood, and metal, etc.

In addition, a cured product of the aforementioned resin composition has favorable adhesiveness to a material containing cement. For that reason, the sealing agent of the present embodiment is suitable especially for an application for repairing cracks of a structure made of a material containing cement, such as concrete, asphalt concrete, and mortar, or a structure made of a material containing wood and/or a metal and cement.

In the case where the sealing agent of the present embodiment is of a two-liquid type, by mixing the first liquid and the second liquid and then allowing to stand in the environment at −20° C. to normal temperature (25° C.), a cured product which is excellent in strength development can be formed within 24 hours.

The sealing agent of the present embodiment is not particularly limited so long as it is one containing the resin composition of the present embodiment. In consequence, the sealing agent of the present embodiment may be one composed of only the resin composition of the present embodiment or may be one containing other component together with the resin composition of the present embodiment. Examples of the other component include components to be contained in a known sealing agent.

[Crack Repairing Method]

The crack repairing method of the present embodiment includes a step of coating the aforementioned sealing agent on the cracked surface of a structure and then curing.

In the crack repairing method of the present embodiment, in the case of using a two-liquid type as the sealing agent, the sealing agent is first prepared in such a manner that it is separately stored into a first liquid containing the aforementioned resin component, the aromatic tertiary amine (C) represented by the general formula (I), and the filler (E) and further optionally containing the plasticizer (F) and/or the internal release agent (G) and a second liquid containing the organic peroxide (D), and the first liquid and the second liquid are mixed.

Subsequently, the aforementioned sealing agent is coated on a crack of the structure. At this time, in the case of an injection method requiring a washer, the sealing agent is coated on the washer, and this is fixed on the crack. Thereafter, on the crack other than the washer-fitted portion, the sealing agent is coated along the crack. At this time, a thickness and a width of the sealing agent and a tool to be used are not particularly limited.

The washer as referred to herein is an adaptor for fixing a tool for injecting an injecting agent into the crack (for example, a tube cylinder).

Furthermore, a crack injection agent is injected into the crack of the structure. The crack injection agent is not particularly limited, and it may be an inorganic material or an organic material. In the case where the crack injection agent is an organic material, the kind of the resin to be used is not particularly limited.

Although a method of injecting the crack injection agent into the crack of the structure is not particularly limited, examples thereof include a method of injecting the crack injection agent directly into the crack of the structure by using a cylinder or the like. A pressure required on the occasion of injecting the crack injection agent into the crack of the structure may be any of a low pressure, a medium pressure, and a high pressure without particular limitations.

The crack injection agent thus injected into the crack of the structure is cured within the crack to form a cured product.

Subsequently, the sealing agent coated on the crack of the structure is removed, as the need arises. At this time, a tool to be used for the removal is not limited.

EXAMPLES

Next, the present invention is specifically described by reference to Examples, but it should be construed that the present invention is by no means limited by these Examples.

According to the methods described in the following Synthesis Examples 1 to 4, resin components (VE1, VE2, VE3, and UA1) each containing a radical reactive resin (A) (hereinafter occasionally referred to as "component (A)") and a radical polymerizable unsaturated monomer (B) having a (meth)acryloyl group in a molecule thereof (hereinafter occasionally referred to as "component (B)") were obtained.

Synthesis Example 1

A reactor equipped with a stirrer, a reflux condenser, a gas introduction tube, and a thermometer was charged with 151 g of a bisphenol A type epoxy resin (EPOMIK (registered trademark) R140P, manufactured by Mitsui Chemicals, Inc., equivalent: 189), 188 g of 1,6-hexanediol diglycidyl ether (equivalent: 157), 129 g of trimethylolpropane diallyl ether, 91 g of tetrahydrophthalic anhydride, and 145 g of dicyclopentenyloxyethyl methacrylate and subjected to temperature rise to 90° C. In a state of keeping that temperature, 1.0 g of 2,4,6-tris(dimethylaminomethyl) phenol and 0.3 g of methylhydroquinone were added, and the temperature was raised to 110° C. while flowing the air, to perform the reaction. When the acid value reached 25 mgKOH/g, 120 g of methacrylic acid and 1.0 g of 2,4,6-tris(dimethylaminomethyl) phenol were added, and the temperature was raised to 130° C. In a state of keeping that temperature, the reaction was performed, and when the acid value reached 14 mgKOH/g, the reaction was finished. There was thus obtained a mixture of a vinyl ester resin as the component (A) and dicyclopentenyloxyethyl methacrylate as the component (B).

Subsequently, to this mixture of the component (A) and the component (B), 1.1 g of paraffin wax 125° F. and three kinds of, as the component (B), 289 g of dicyclopentenyloxyethyl methacrylate, 670 g of phenoxyethyl methacrylate, and 167 g of acryloyl morpholine were added. There was thus obtained a vinyl ester resin composition (VE1) composed of 35% by mass of the component (A) and 65% by mass of the component (B).

Synthesis Example 2

A mixture of a vinyl ester resin as the component (A) and dicyclopentenyloxyethyl methacrylate as the component (B) was obtained in the same manner as in Synthesis Example 1. To this mixture of the component (A) and the component (B), 1.1 g of paraffin wax 125° F. and three kinds of, as the component (B), 289 g of dicyclopentenyloxyethyl methacrylate, 547 g of phenoxyethyl methacrylate, and 290 g of diethylene glycol dimethacrylate were added. There was thus obtained a vinyl ester resin composition (VE2) composed of 35% by mass of the component (A) and 65% by mass of the component (B).

Synthesis Example 3

A reactor equipped with a stirrer, a reflux condenser, a gas introduction tube, and a thermometer was charged with 189 g of a bisphenol A type epoxy resin (EPOMIK (registered trademark) R140P, manufactured by Mitsui Chemicals, Inc., equivalent: 189) and 73.2 g of trimethylolpropane diallyl ether and subjected to temperature rise to 90° C. In a state of keeping that temperature, 0.1 g of methylhydroquinone was added, and the temperature was raised to 110° C. while flowing the air, to perform the reaction. When the acid value reached 18 mgKOH/g, 69 g of methacrylic acid and 0.5 g of 2,4,6-tris(dimethylaminomethyl) phenol were added, and the temperature was raised to 130° C. In a state of keeping that temperature, the reaction was performed, and when the acid value reached 12 mgKOH/g, the reaction was finished. There was thus obtained a vinyl ester resin as the component (A).

To this component (A), 0.4 g of paraffin wax 125° F. and, as the radical polymerizable unsaturated monomer (B), 338 g of dicyclopentenyloxyethyl methacrylate and 35 g of phenoxyethyl methacrylate were added. There was thus obtained a vinyl ester resin composition (VE3) composed of 47% by mass of the component (A) and 53% by mass of the component (B).

Synthesis Example 4

A reactor equipped with a stirrer, a reflux condenser, a gas introduction tube, and a thermometer was charged with 226 g of 4,4'-diphenylmethane diisocyanate (molecular weight: 250), 610 g of polypropylene glycol (molecular weight: 1,011), 320 g of acryloyl morpholine, 576 g of methoxyethyl methacrylate, and 0.3 g of hydroquinone and subjected to temperature rise to 60° C. while flowing the air. In a state of keeping that temperature, 0.02 g of dibutyltin dilaurate was added. Thereafter, the temperature was raised to 70° C. to perform the reaction. As a result of infrared absorption spectroscopy (IR spectroscopy), when no change in the peak ratio of a wave number of 2,270 cm 1 and a wave number of 1,730 $cm^{-1}$ was found, 91 g of 2-hydroxypropyl methacrylate and subsequently 0.06 g of dibutyltin dilaurate were added, and the temperature was raised to 75° C., to perform the reaction. As a result of the IR spectroscopy, after confirming that the peak derived from the isocyanate at a wave number of 2,270 cm 1 vanished, the reaction was finished. There was thus obtained a mixture of a urethane methacrylate resin as the component (A) and acryloyl morpholine and methoxyethyl methacrylate as the component (B).

To the mixture of the component (A) and the component (B), three kinds of, as the radical polymerizable unsaturated monomer (B), 832 g of dicyclopentenyloxyethyl methacrylate, 448 g of lauryl methacrylate, and 96 g of methyl methacrylate were added. There was thus obtained a urethane methacrylate resin (UA1) composted of 29% by mass of the component (A) and 71% by mass of the component (B).

Examples 1 to 4

Each of the resin components (VE1, VE2, VE3, and UA1) synthetized in Synthesis Examples 1 to 4 was mixed with an aromatic tertiary amine (C), an organic peroxide (D), a filler (E), a plasticizer (F), an internal release (G), and a thixotropic auxiliary as mentioned below in proportions shown in Table 1 in an atmosphere at 23° C. There were thus prepared respective radical polymerizable putty-like resin compositions of Examples 1 to 4 and provided as sealing agents. In Table 1, the blank expresses “not blended”.

As the aromatic tertiary amine (C), N, N-di(β-hydroxyethyl)-p-toluidine (trade name: PT-2HE, manufactured by MORIN Chemical Industries Co., Ltd.) was used.

As the organic peroxide (D), dibenzoyl peroxide (trade name: NYPER NS, manufactured by NOF Corporation) was used.

As the filler (E), a silica powder (trade name; AEROSIL (registered trademark) 200, manufactured by Nippon Aerosil Co., Ltd.) was used.

As the plasticizer (F), dibutyl phthalate (manufactured by Showa Ether Co., Ltd.) was used.

As the internal release agent (G), a phosphoric acid ester (trade name: ZELEC UN, manufactured by Maeda Industrial Chemicals Co., Ltd.) was used.

As the thixotropic auxiliary, BYK R605 (trade name, manufactured by BYK-Chemie GmbH) was used.

Examples 5 to 8

Respective radical polymerizable putty-like resin compositions of Examples 5 to 8 were prepared in the same manner as in Examples 1 to 4, except for not using the plasticizer (F), and provided as sealing agents.

Example 9

A radical polymerizable putty-like resin composition of Example 9 was prepared in the same manner as in Example 8, except for further using 0.1 parts by mass of the internal release agent (G), and provided as a sealing agent.

Comparative Example 1

A resin composition of Comparative Example 1 was prepared in the same manner as in Example 7, except for not using the filler (E) and the thixotropic auxiliary, and provided as a sealing agent.

Comparative Example 2

A resin composition of Comparative Example 2 was prepared in the same manner as in Example 8, except for not using the filler (E) and the thixotropic auxiliary, and provided as a sealing agent.

Comparative Example 3

As a sealing agent, a two-liquid type epoxy resin composed of a liquid A and a liquid B (trade name: QUICK MENDER, manufactured by Konishi Co., Ltd.) was used.

[Anti-Sagging Properties]

In Examples 1 to 9 and Comparative Examples 1 and 2, the putty-like resin compositions having the components other than the organic peroxide (D) mixed therein were each allowed to stand in a low-temperature atmosphere at −10° C. for 24 hours. The putty-like resin compositions, each of which had been allowed to stand in a low-temperature atmosphere at −10° C. for 24 hours, were each mixed with the organic peroxide (D), and the anti-sagging properties in a state until the mixture was cured in the low-temperature atmosphere at −10° C. were evaluated according to the following criteria. The results are shown in Table 1.

In Comparative Example 3, the liquid A and the liquid B were each allowed to stand in a low-temperature atmosphere at −10° C. for 24 hours. The liquid A and the liquid B, each of which had been allowed to stand in a low-temperature atmosphere at −10° C. for 24 hours, were mixed in a ratio of 1/1 in terms of a weight ratio, and the anti-sagging properties in a state until the mixture was cured in the low-temperature atmosphere at −10° C. were evaluated according to the following criteria. The results are shown in Table 1.

Here, in the evaluation, an injection washer which is used in a general cylinder method was used. The injection washer is a tool for fitting an injector. The sealing agent was coated on the installation surface of a concrete or the like relative to the washer, and this was pushed on the concrete surface and installed.

<<Criteria>>

A: The resin composition coated on the washer does not sag, and the washer installed on the concrete surface does not fall off.

C: The resin composition coated on the washer sags, or the washer cannot be installed on the concrete surface.

[Curability]

The radical polymerizable putty-like resin compositions obtained in Examples 1 to 9 and Comparative Examples 1 and 2 were each allowed to stand in a low-temperature atmosphere at −10° C. for 24 hours. The curability of each of the radical polymerizable putty-like resin compositions, each of which had been allowed to stand in a low-temperature atmosphere at −10° C. for 24 hours, was evaluated according to the following criteria. The results are shown in Table 1.

In Comparative Example 3, the liquid A and the liquid B were each allowed to stand in a low-temperature atmosphere at −10° C. for 24 hours. The liquid A and the liquid B, each of which had been allowed to stand in a low-temperature atmosphere at −10° C. for 24 hours, were mixed in a ratio of 1/1 in terms of a weight ratio, and the obtained mixed liquid was allowed to stand in a low-temperature atmosphere at −10° C. for 24 hours. However, the mixed liquid was not cured.

<<Criteria>>

A: Cured

C: Uncured

[Adhesiveness]

In the respective radical polymerizable putty-like resin compositions obtained in Examples 1 to 9 and Comparative Examples 1 and 2, the radical polymerizable putty-like resin compositions in which all of the evaluation of the aforementioned “Anti-Sagging Properties” and the evaluation of the aforementioned “Curability” were graded as “A” were each allowed to stand in a low-temperature atmosphere at −10° C. for 24 hours, and then, the adhesiveness was evaluated according to the following criteria. The results are shown in Table 1. In Comparative Examples 1 and 2, the evaluation of the aforementioned “Anti-Sagging Properties”, the anti-sagging properties were low so that the washer could not be installed, and thus, the evaluation of the adhesiveness was not performed. In addition, the mixed liquid prepared in Comparative Example 3 was not cured in the evaluation of the aforementioned “Curability”, and thus, it was not evaluated for the adhesiveness.

Here, an injection washer which is used in a general cylinder method was used. The injection washer is a tool for fitting an injector. The sealing agent (radical polymerizable putty-like resin composition) was coated on the installation surface of a concrete or the like relative to the washer, and this was pushed on the concrete surface and installed. The coating of the sealing agent on the concrete was performed in a thickness of 2 mm.

With respect to the evaluation, an injector and an injection washer to be used in a low-pressure injection method regarding the general cylinder method were used. Here, the air was injected under a pressure of 0.3 MPa.

<<Criteria>>

A: The resin composition withstands the injection pressure.

C: The resin composition does not withstand the injection pressure, and the air leaks.

[Release Properties]

In the respective radical polymerizable putty-like resin compositions obtained in Examples 1 to 9 and Comparative Examples 1 and 2, the radical polymerizable putty-like resin compositions in which all of the evaluation of the aforementioned “Anti-Sagging Properties” and the evaluation of the aforementioned “Curability” were graded as “A” were each allowed to stand in a low-temperature atmosphere at −10° C. for 24 hours, and the release properties were evaluated according to the following criteria. The results are shown in Table 1. In Comparative Examples 1 and 2, the evaluation of the aforementioned “Anti-Sagging Properties”, the anti-sagging properties were low so that the washer could not be installed, and thus, the evaluation of the release properties was not performed. In addition, the mixed liquid prepared in Comparative Example 3 was not cured in the evaluation of the aforementioned “Curability”, and thus, it was not evaluated for the release properties.

In the evaluation, a release work was carried out by using a bare hand, a kawasuki, or a scraper, etc.

<<Criteria>>

A: The coated resin composition is easily peeled off, and fracture on the installed surface to be caused due to the release is not observed.

B: The coated resin composition can be peeled off, but fracture on the installed surface is caused.

C: The coated resin composition cannot be peeled off.

TABLE 1

| | | Unit | Example 1 | Example 2 | Example 3 | Example 4 | Example 5 | Example 6 |
|---|---|---|---|---|---|---|---|---|
| Resin composition | VE1 | Parts by mass | 100 | | | | 100 | |
| | VE2 | Parts by mass | | 100 | | | | 100 |
| | VE3 | Parts by mass | | | 100 | | | |
| | UA1 | Parts by mass | | | | 100 | | |
| Two-liquid type epoxy resin | Liquid A | Parts by mass | | | | | | |
| | Liquid B | Parts by mass | | | | | | |
| Aromatic tertiary amine (C) | PT-2HE | Parts by mass | 2 | 2 | 2 | 2 | 2 | 2 |
| Organic peroxide (D) | NYPER NS | Parts by mass | 5 | 5 | 5 | 5 | 5 | 5 |
| Filler (E) | AEROSIL ® 200 | Parts by mass | 6 | 6 | 6 | 6 | 6 | 6 |
| Plasticizer (F) | Dibutyl phthalate | Parts by mass | 10 | 10 | 10 | 10 | | |
| Internal release agent (G) | ZELEC UN | Parts by mass | | | | | | |
| Thixotropic auxiliary | R-605 | Parts by mass | 0.6 | 0.6 | 0.6 | 0.6 | 0.6 | 0.6 |
| Proportion of component (A) relative to the whole amount of resin composition | | % by mass | 28.3 | 28.3 | 38.0 | 23.5 | 30.8 | 30.8 |
| Proportion of component (B) relative to the whole amount of resin composition | | % by mass | 52.6 | 52.6 | 42.9 | 57.4 | 57.2 | 57.2 |

TABLE 1-continued

| | | | | | | | |
|---|---|---|---|---|---|---|---|
| Mass ratio [(A)/(B)] | — | 35/65 | 35/65 | 47/53 | 29/71 | 35/65 | 35/65 |
| Anti-sagging properties | — | A | A | A | A | A | A |
| Curability | — | A | A | A | A | A | A |
| Adhesiveness | — | A | A | A | A | A | A |
| Release properties | | A | A | A | A | B | B |

| | | Example 7 | Example 8 | Example 9 | Comparative Example 1 | Comparative Example 2 | Comparative Example 3 |
|---|---|---|---|---|---|---|---|
| Resin composition | VE1 | | | | | | |
| | VE2 | | | | | | |
| | VE3 | 100 | | | 100 | | |
| | UA1 | | 100 | 100 | | 100 | |
| Two-liquid type epoxy resin | Liquid A | | | | | | 50 |
| | Liquid B | | | | | | 50 |
| Aromatic tertiary amine (C) | PT-2HE | 2 | 2 | 2 | 2 | 2 | |
| Organic peroxide (D) | NYPER NS | 5 | 5 | 5 | 5 | 5 | |
| Filler (E) | AEROSIL ® 200 | 6 | 6 | 6 | | | |
| Plasticizer (F) | Dibutyl phthalate | | | | | | |
| Internal release agent (G) | ZELEC UN | | | 0.1 | | | |
| Thixotropic auxiliary | R-605 | 0.6 | 0.6 | 0.6 | | | |
| Proportion of component (A) relative to the whole amount of resin composition | | 30.8 | 41.4 | 25.5 | 25.5 | 43.9 | — |
| Proportion of component (B) relative to the whole amount of resin composition | | 46.6 | 62.5 | 62.5 | 49.6 | — | — |
| Mass ratio [(A)/(B)] | | 47/53 | 29/71 | 29/71 | 47/53 | — | — |
| Anti-sagging properties | | A | A | A | C | C | A |
| Curability | | A | A | A | A | A | C |
| Adhesiveness | | A | A | A | — | — | — |
| Release properties | | B | B | A | — | — | — |

As shown in Table 1, the radical polymerizable putty-like resin compositions of Examples 1 to 9 are cured for a short time even in the low temperature environment of −10° C. and have favorable anti-sagging properties. In addition, the cured products of the radical polymerizable putty like resin compositions of Examples 1 to 9 have favorable adhesiveness. Furthermore, it was confirmed that the cured products of the radical polymerizable putty like resin compositions of Examples 1 to 4 and 9 have favorable release properties.

In contrast, though the resin compositions of Comparative Examples 1 and 2 not using the filler (E) have curability in the low-temperature environment of −10° C., they are low in the anti-sagging properties, so that the washer for fitting an injector could not be installed. Furthermore, though the resin composition of Comparative Example 3 using the epoxy resin is high in the anti-sagging properties, it could not be cured within 24 hours at −10° C. In Comparative Examples 1 to 3, the evaluation of adhesiveness and release properties could not be achieved because the washer cannot be installed, or curing is not achieved.

The invention claimed is:

1. A radical polymerizable putty-like resin composition comprising a resin component containing a radical reactive resin (A) and a radical polymerizable unsaturated monomer (B) having a (meth)acryloyl group in a molecule thereof, an aromatic tertiary amine (C) represented by the following general formula (I), an organic peroxide (D), and a filler (E):

(I)

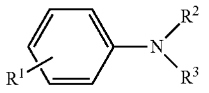

wherein, $R^1$ is a hydrogen atom, a methyl group, or a methoxy group; and $R^2$ and $R^3$ are each independently an alkyl group having 1 to 20 carbon atoms or a hydroxyalkyl group having 1 to 20 carbon atoms, wherein the resin composition further comprises a plasticizer (F) and an internal release agent (G), and the content of the plasticizer (F) is from 5 to 200 parts by mass based on 100 parts by mass of the resin component, and the internal release agent (G) is at least one selected from the group consisting of a phosphoric acid ester and a fluorine-containing release agent, and the internal release agent (G) is contained in an amount of 0.01 to 1 part by mass based on 100 parts by mass of the resin component, and the resin composition has a thixo index (TI) of 3.5 or more.

2. The radical polymerizable putty-like resin composition according to claim 1, wherein the radical reactive resin (A) is at least one selected from the group consisting of a vinyl ester resin, a urethane (meth)acrylate resin, and a polyester (meth)acrylate resin.

3. The radical polymerizable putty-like resin composition according to claim 1, wherein the radical polymerizable unsaturated monomer (B) is at least one selected from the group consisting of a mono(meth)acrylic acid ester, a di(meth)acrylic acid ester, and a tri(meth)acrylic acid ester.

4. The radical polymerizable putty-like resin composition according to claim 1, wherein in the aromatic tertiary amine (C) represented by the general formula (I), $R^1$ is a hydrogen atom, a methyl group, or a methoxy group; and $R^2$ and $R^3$ are each independently an alkyl group having 1 to 6 carbon atoms or a hydroxyalkyl group having 1 to 6 carbon atoms.

5. The radical polymerizable putty-like resin composition according to claim 1, wherein the organic peroxide (D) is at least one selected from the group consisting of dibenzoyl peroxide, benzoyl m-methylbenzoyl peroxide, m-toluoyl peroxide, methyl ethyl ketone peroxide, cumene hydroperoxide, and t-butyl peroxybenzoate.

6. The radical polymerizable putty-like resin composition according to claim 1, wherein the filler (E) is at least one selected from the group consisting of an inorganic filler made of talc, calcium carbonate, silica sand, or fine particulate silica; and an organic filler made of an organic compound fiber made of a polyester or a polyolefin.

7. The radical polymerizable putty-like resin composition according to claim 1, the plasticizer (F) being at least one selected from the group consisting of a phthalic acid ester, an adipic acid ester, and a citric acid ester.

8. The radical polymerizable putty-like resin composition according to claim 1, wherein the internal release agent (G) is a phosphoric acid ester.

9. The radical polymerizable putty-like resin composition a according to claim 1, wherein a mass ratio [(A)/(B)] of the radical reactive resin (A) to the radical polymerizable unsaturated monomer (B) is ¼ to 3/2.

10. The radical polymerizable putty-like resin composition according to claim 1, wherein the content of the radical reactive resin (A) relative to the whole amount of the radical polymerizable putty-like resin composition is from 20 to 60% by mass.

11. The radical polymerizable putty-like resin composition according to claim 1, wherein the content of the radical polymerizable unsaturated monomer (B) relative to the whole amount of the radical polymerizable putty-like resin composition is from 40 to 80% by mass.

12. The radical polymerizable putty-like resin composition according to claim 1, wherein the content of the aromatic tertiary amine (C) represented by the general formula (I) is from 0.1 to 10 parts by mass based on 100 parts by mass of the resin component.

13. The radical polymerizable putty-like resin composition according to claim 1, wherein the content of the organic peroxide (D) is from 0.1 to 10 parts by mass based on 100 parts by mass of the resin component.

14. The radical polymerizable putty-like resin composition according to claim 1, wherein the content of the filler (E) is from 0.1 to 100 parts by mass based on 100 parts by mass of the resin component.

15. A sealing agent comprising the radical polymerizable putty-like resin composition according to claim 1.

16. A crack repairing method comprising a step of coating the sealing agent according to claim 15 on the cracked surface of a structure and then curing.

17. The crack repairing method according to claim 16, further injecting an injecting agent into a crack of the structure, curing, and then removing the sealing agent.

* * * * *